United States Patent Office 3,255,120
Patented June 7, 1966

3,255,120
HEAT AND INFRA-RED RESPONSIVE GLASS COMPOSITION AND METHOD OF MAKING IT
Sabatino Cohen, Bourg-la-Reine, France, assignor to Compagnie de Saint-Gobain, Neuilly-sur-Seine, France
No Drawing. Filed Jan. 3, 1962, Ser. No. 164,168
Claims priority, application France, Jan. 5, 1961, 848,845
8 Claims. (Cl. 252—301.4)

This invention relates to glass which can be energized by exposure to radiation such as X-rays, gamma rays and atomic particles and which, after irradiation, will respond to heat with the emission of light.

Practically all glass becomes thermoluminescent if it is irradiated long enough but there are few glasses which will respond to a relatively feeble irradiation and retain the necessary charge for a useful period of time.

The electrons displaced by the irradiation or bombardment of glass return to their original position by a complex process of which the duration may be very long, and during this period they have the property of emitting light. This property of emitting light may be intensified by heating and it is then called thermoluminescence. It is possible to represent the quality of such glass by a curve which has as one coordinate the intensity of the light emitted and as the other the temperature at which the light is emitted. Such curves present a maximum which is characterized by its height on the chart and by the temperature at which it occurs. The height of the maximum is used as the sensitivity of the glass. The more the temperature T approaches room temperature the more rapidly the glass loses, in the course of time, the stored energy. The phenomenon is called fading. It will be understood that, for a given application of the glass, the ability to provide a maximum at a temperature which is not too high is a material advantage. It may be also an advantage to provide a glass which retains its thermoluminescent properties for a long time.

It is an object of the invention to provide glasses which have a maximum thermoluminescence at relatively low dosage and temperature, and which retain the property for substantial periods of time.

The objects of the invention are accomplished, generally speaking, by a glass, energizable by irradiation, which responds to heat with the emission of light, having the composition $SiO_2$,
$GeO_2$ with a maximum at about 10 mole percent,
Alkali metal oxides 0–10 mole percent,
$Al_2O_3$ and/or $B_2O_3$ 0–5 mole percent.

These glasses are sensitive to and may be charged by X-rays, gamma rays and by the bombardment of atomic particles. These glasses have a basic composition of $SiO_2$ and $GeO_2$ in which $GeO_2$ is present from traces to a maximum of about 10 mole percent of the combined total of silica and $GeO_2$. To this silica-$GeO_2$ system there may be added alkali oxides, particularly $K_2O$ or $Na_2O$, but the content of these alkali metal oxides should be substantially lower than 10 mole percent of the combined total of the three ingredients. The glasses containing $SiO_2$ and $GeO_2$ and those containing $SiO_2$, $GeO_2$ and $K_2O$ are very sensitive, their maxima are about 90° C. and they fade at ambient temperature.

The glasses containing $SiO_2$, $GeO_2$ and $Na_2O$ are sensitive and have two maxima of which one occurs at 90° C. and the other at 250° C. The second maximum being at high temperature the corresponding fading is very low when the glass is kept at room temperature so that the thermoluminescent properties corresponding to this maximum may remain as long as 15 days after irradiation, during which course the activity corresponding to the 90° maximum will have completely disappeared.

There may be added to the glasses containing $SiO_2$, $GeO_2$ and $Na_2O$ some alumina and/or boric anhydride which may reach a molecular percentage of 5. The function of these additives is to change the relative importance of the two maxima.

The molecular percentages given above are percentages of a particular ingredient to the total of all ingredients.

At present, photographic films are exposed and used to determine the level of radiation to which personnel working around nuclear installations are exposed. These new glasses can be used to replace this test, being suspended in places where they would be subjected to the same radiation which reaches the personnel. They may then be activated by simple heating to reveal by the brightness of the light emitted the intensity of the radiation to which the personnel have been subjected.

*Example 1*

A mixture of raw materials $SiO_2$, $GeO_2$ and $Na_2O$ was made so as to provide in the glass 98 moles of $SiO_2$, 1 mole of $GeO_2$, and 1 mole of $Na_2O$. The raw materials were heated in a high frequency induction furnace to 1700° C. The fusion of the raw materials may be done by means of an oxyhydrogen blow torch. The glass was annealed at 600° C. and maintained at that temperature for 48 hours. The prolonged, high temperature annealing stabilized the thermoluminescent properties of the glass.

The glass was formed into a disc of 20 mm. in diameter and 3 mm. in thickness.

The sensitivity of the glass obtained in the foregoing example was 50 mr. for X-rays of 150 kv. Doses up to 100,000 r. were carried out without reaching saturation.

To obtain the phenomenon of thermoluminescence it sufficed to place the irradiated glass disc on a heating plate which was maintained in operative range of a photomultiplier which responded with a signal corresponding to the intensity of the light emitted. Photomultipliers are known and need not be described.

A particular advantage of the present composition is that the luminescence may be released by subjecting the irradiated glass to infrared rays, which is satisfactory as there is no appreciable increase in the temperature of the glass. One may make the infra-red image visible by turning the rays onto glasses which have been irradiated, or which are simultaneously being irradiated.

A second application of the glasses of this invention is the preservation of an invisible image and its liberation by heating. For example a plate of glass of the type herein described may be irradiated by X-rays in a pattern, by forming the pattern in a lead shield which is interposed between the X-rays and the glass. The X-rays pass only through the apertures of the pattern and affect only the glass which is beneath the apertures. When the plate is uniformly heated, only the irradiated parts, the pattern, becomes luminous.

If the plate is heated rapidly to a high temperature (300° to 500° C.), the image is very brilliant but lasts only for a short time, but if the plate is heated to a lower temperature the image is less brilliant but lasts longer. The total quantity of light emitted is the same in both cases.

To enable the interpretation of the results to be uniform it is preferable to heat the disc at a constant speed not exceeding 0.3°/sec.

Example 2

A mixture of raw materials $SiO_2$, $GeO_2$, $Na_2O$ and $Al_2O_3$ was made to provide in the glass:

| | Mole percent |
|---|---|
| $SiO_2$ | 99.57 |
| $GeO_2$ | 0.06 |
| $Na_2O$ | 0.25 |
| $Al_2O_3$ | 0.12 |

For said glass the second maxima occurs at about 300° C.

The sensivity of the glass is better than 50 mr. for gamma rays of cobalt 60.

Although only a limited number of embodiments of the invention are described in detail in the foregoing specification, it is to be expressly understood that the invention is not limited thereto. Various other changes which will now be apparent to those skilled in the art may also be made without departing from the spirit and scope of the invention.

What is claimed is:

1. Glass, energizable by irradiation, which responds to heat or infra-red light with the emission of light, having the composition $SiO_2$,
   $GeO_2$ with a maximum at about 10 mole percent,
   Alkali metal oxides, not exceeding 10 mole percent.

2. Glass, energizable by irradiation according to claim 1 in which the alkali metal oxide is $K_2O$.

3. Glass, energizable by irradiation according to claim 1 in which the alkali metal oxide is $Na_2O$.

4. Glass energizable by irradiation according to claim 1 in which the alkali metal oxide is a mixture of $K_2O$ and $Na_2O$.

5. Glass, energizable by irradiation, which responds to heat or infra-red light with the emission of light, having the composition $SiO_2$,
   $GeO_2$ with a maximum at about 10 mole percent,
   Alkali metal oxides, not exceeding 10 mole percent,
   $Al_2O_3$ and $B_2O_3$ not exceeding 5 mole percent.

6. Glass consisting of $SiO_2$ and $GeO_2$, the $GeO_2$ being not substantially more than 10 mole percent of the weight of the glass, the said glass having the electron displacement which is revealed by emission of light at superatmospheric temperature and under the impact of infra-red light.

7. Glass consisting of
   $SiO_2$ and $GeO_2$, the $GeO_2$ being not substantially over 10 mole percent,
   and permissibly having alkali metal oxides from 0 to about 10 mole percent,
   and oxides consisting of at least one of $Al_2O_3$ and $B_2O_3$ from 0 to about 5 mole percent,
   the said glass having the internal electron displacement which is revealed by the emission of light at superatmospheric temperature and under the impact of infra-red light.

8. A method of making heat and infra-red responsive glass which comprises bombarding glass having as its constituents $SiO_2$ and $GeO_2$, the $GeO_2$ not being substantially more than 10 mole percent, having from 0 to about 10 mole percent of alkali metal oxides, and having from 0 to about 5 mole percent of at least one oxide from the class consisting of $B_2O_3$ and $Al_2O_3$, and bombarding the glass with radiation of the class of X-rays, gamma rays, and atomic particles until it undergoes an internal, persisting electron displacement which is revealed at elevated temperature and under infra-red rays by the emission of light.

References Cited by the Examiner

UNITED STATES PATENTS

| | | | |
|---|---|---|---|
| 1,607,817 | 11/1926 | Dennis | 106—47 |
| 2,418,489 | 4/1947 | Tillyer | 65—117 |
| 2,457,054 | 12/1948 | Leverenz | 252—301.4 |
| 2,513,207 | 6/1950 | Roberts | 65—29 |
| 2,669,069 | 2/1954 | Merrill | 65—29 |
| 2,761,070 | 8/1956 | Moos et al. | 250—83 |
| 2,775,710 | 12/1956 | Ludeman | 250—71 |
| 2,871,624 | 2/1959 | Upton | 65—117 |
| 2,902,605 | 9/1959 | Wallack | 250—83 |
| 3,025,174 | 3/1962 | Simon | 106—52 |
| 3,029,152 | 4/1962 | Milne | 106—52 |

FOREIGN PATENTS

| | | |
|---|---|---|
| 496,508 | 12/1938 | Great Britain. |
| 842,256 | 7/1960 | Great Britain. |

OTHER REFERENCES

Glaze-Ceramic Bull., volume 34, No. 9 (1955), pages 291–294.

Krakau: Ceramic Abstracts, volume 18, No. 11 (1939), page 293, left column, last item, "Effect of $GeO_2$ Admixtures on the Optical Properties of Glass."

TOBIAS E. LEVOW, *Primary Examiner.*

MAURICE A. BRINDISI, *Examiner.*

H. M. McCARTHY, *Assistant Examiner.*